(No Model.)

W. A. & J. E. SWEET.
TRAIN FOR ROLLING METAL.

No. 303,597.  Patented Aug. 12, 1884.

Witnesses:
Wm Wilson
A. Ward

Inventors
Wm A. Sweet
J. E. Sweet
by J. J. Greenough
Atty (No Model.)

W. A. & J. E. SWEET.
TRAIN FOR ROLLING METAL.

No. 303,597. Patented Aug. 12, 1884.

4 Sheets—Sheet 2.

Witnesses:
W. Wilson
A. Ward

Inventors
W. A. Sweet
J. E. Sweet
by J. J. Greenough (No Model.)
W. A. & J. E. SWEET.
TRAIN FOR ROLLING METAL.
No. 303,597. Patented Aug. 12, 1884.
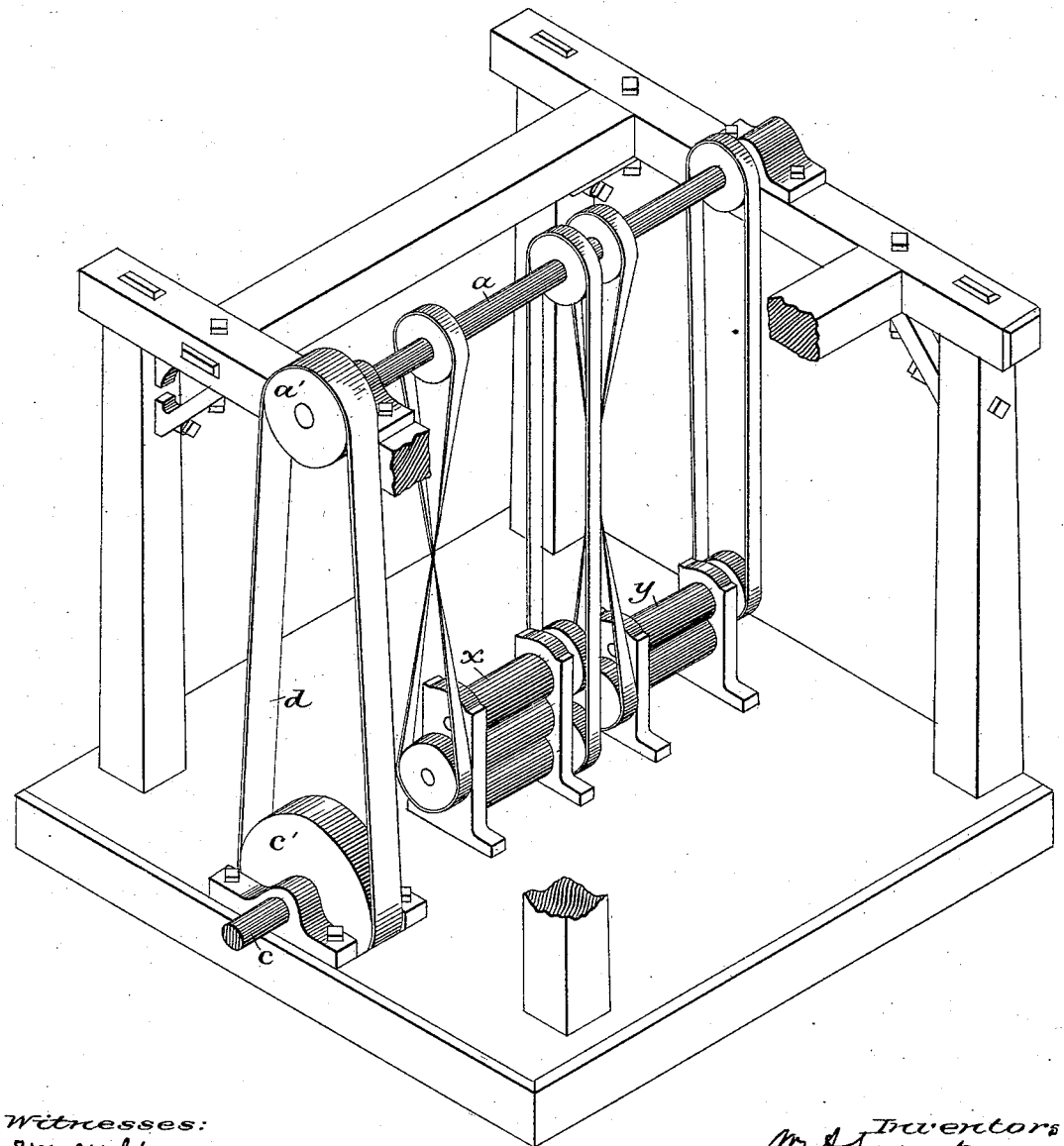

(No Model.) W. A. & J. E. SWEET. 4 Sheets—Sheet 4.
TRAIN FOR ROLLING METAL.
No. 303,597. Patented Aug. 12, 1884.
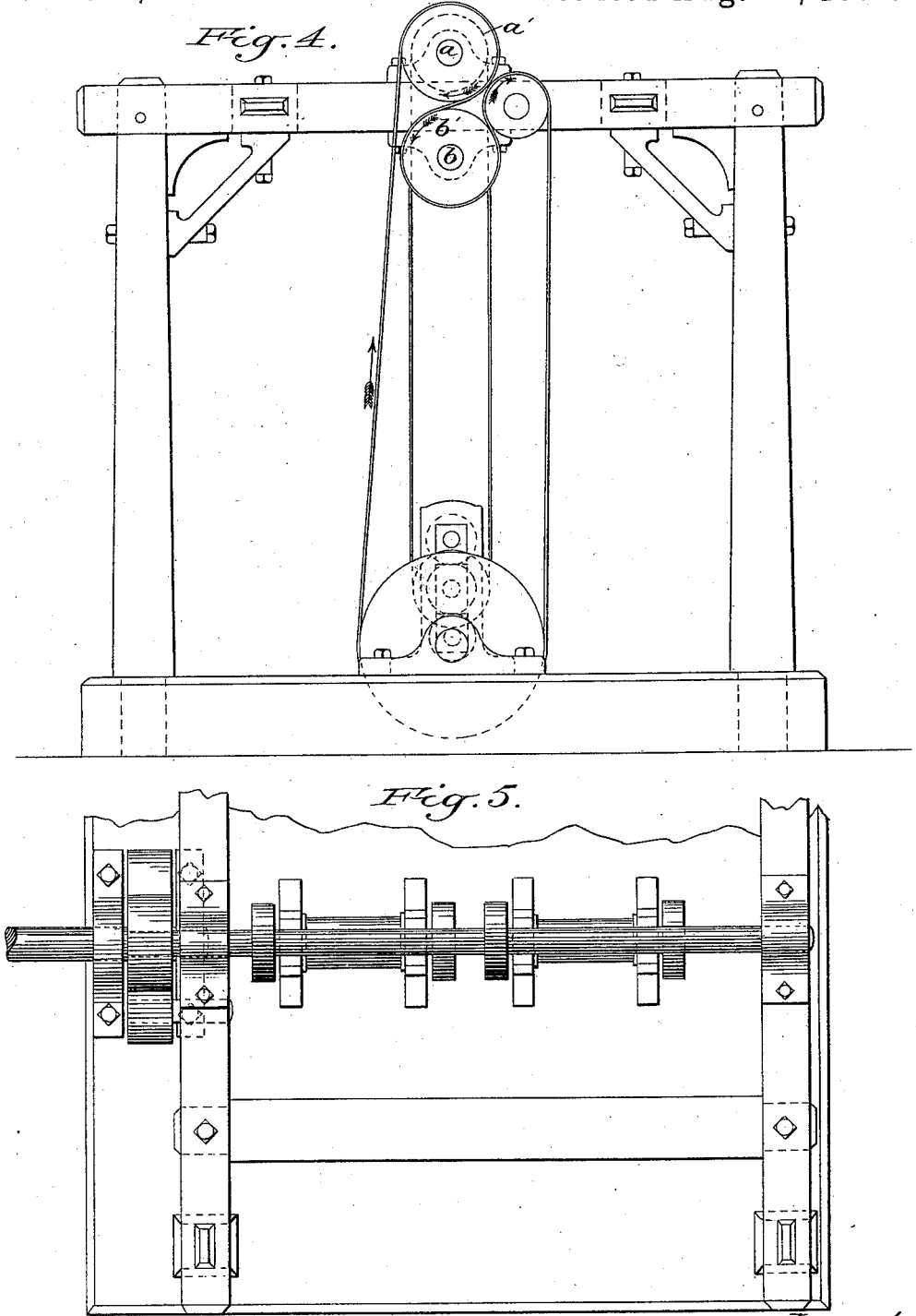

United States Patent Office.

WILLIAM A. SWEET AND JOHN E. SWEET, OF SYRACUSE, NEW YORK; SAID JOHN E. SWEET ASSIGNOR TO SAID WILLIAM A. SWEET.

TRAIN FOR ROLLING METAL.

SPECIFICATION forming part of Letters Patent No. 303,597, dated August 12, 1884.

Application filed May 10, 1883. (No model.)

*To all whom it may concern:*

Be it known that we, WILLIAM A. SWEET and JOHN E. SWEET, both of the city of Syracuse, Onondaga county, and State of New York, have invented certain new and useful Improvements in Trains for Rolling Metal, &c., consisting of the relative size and proportion, and the method of driving the same, of which the following is a specification.

The purpose of our improvement is to drive the several pairs of rollers or triplets, as required, with facility and rapidity in line or otherwise. We also reduce any number of pairs in diameter from the first, to best suit the draft required, while giving to each succeeding pair an increased circumferential velocity equal to or sufficient for the elongation of the rod in its reduction as wanted. The devices by which I attain these objects are illustrated in the accompanying drawings, in which—

Figure 1:
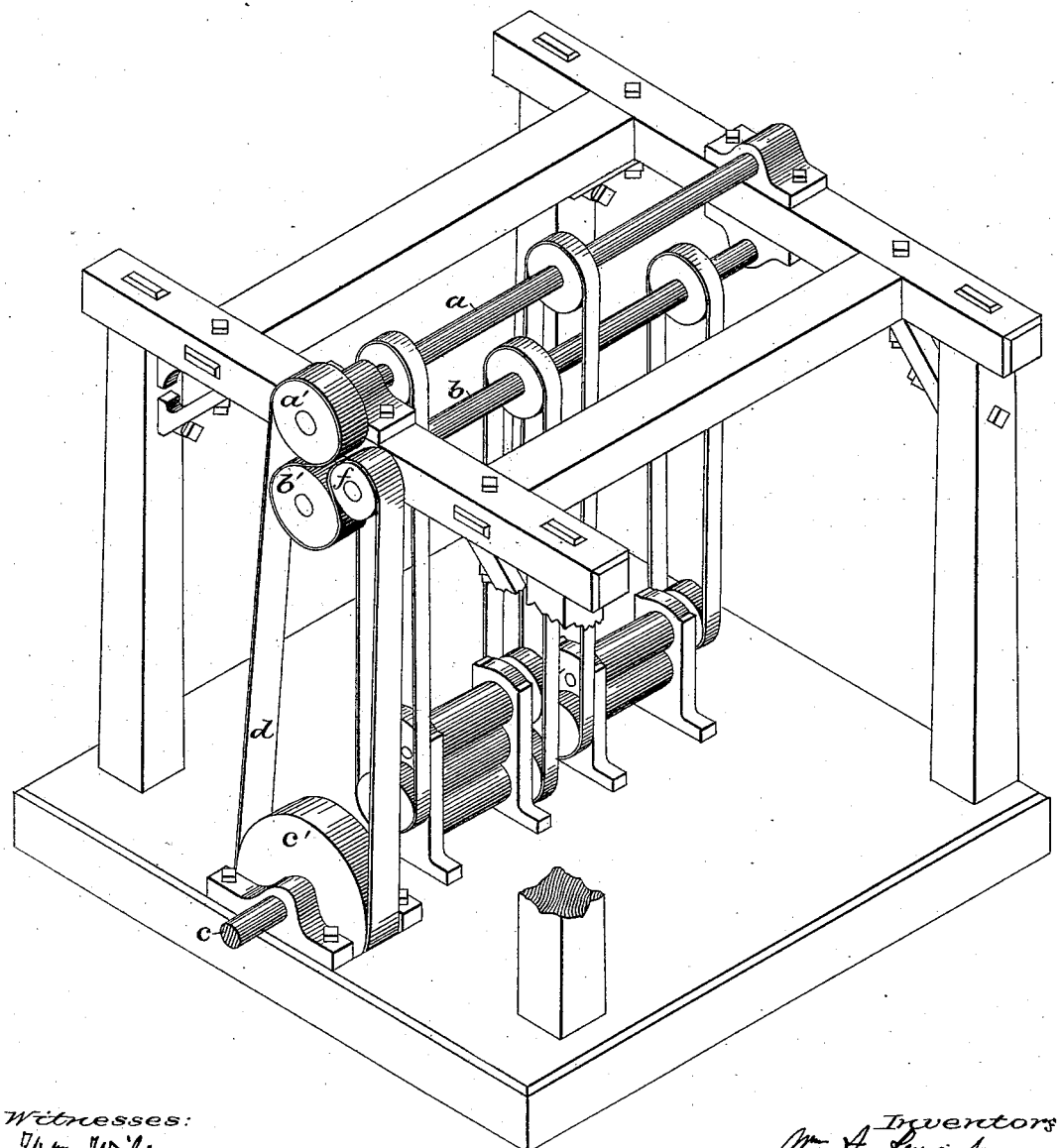
Figure 2:
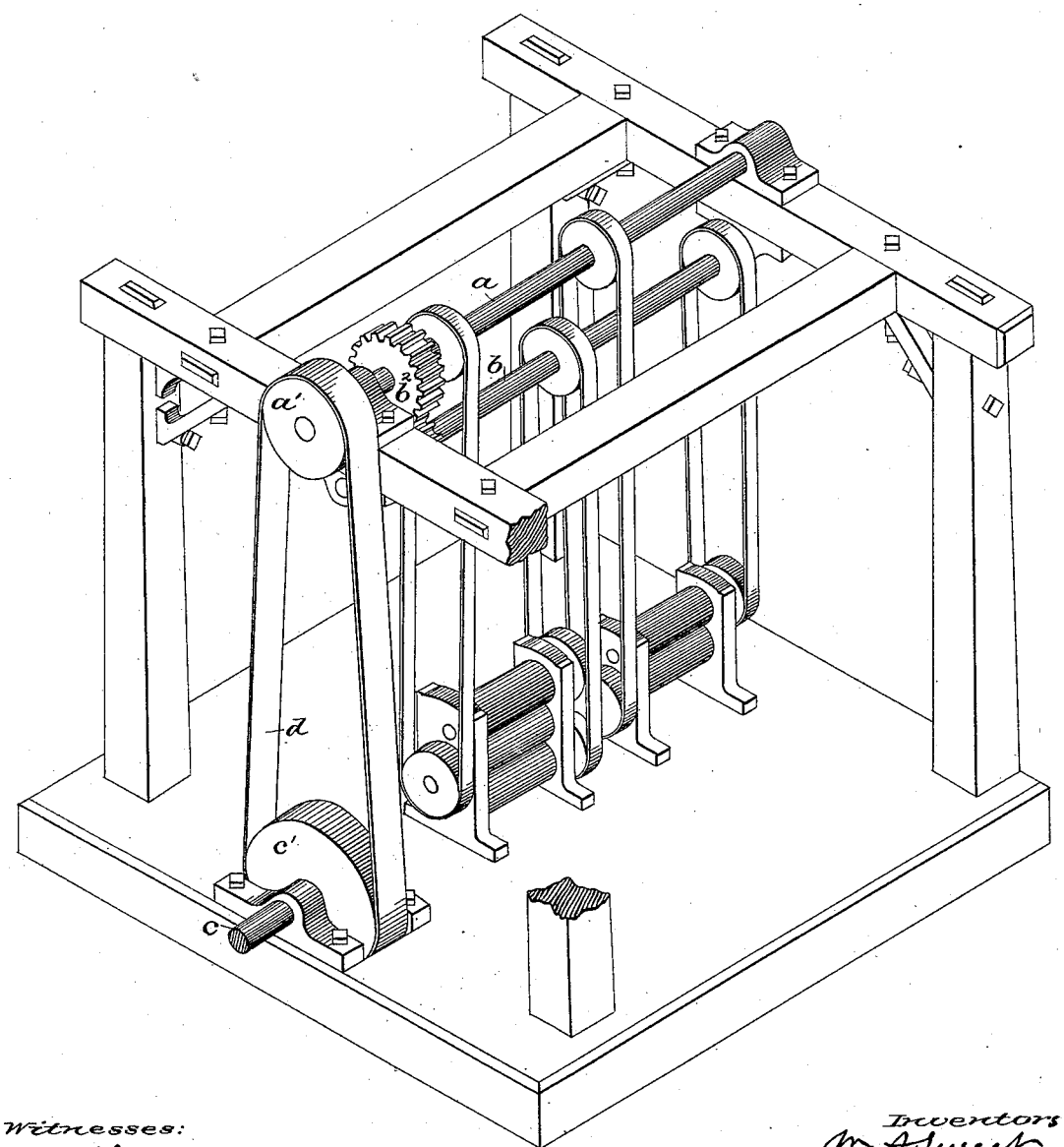

Figure 1 is a perspective view of rollers in train. Fig. 2 is a similar view with modifications; Fig. 3, another modification; Fig. 4, an end elevation; Fig. 5, plan of the train.

Similar letters refer to like parts in all the figures.

We place a series of pairs of rollers in train, preferably placing them in line, as seen in the drawings, above which, in Figs. 1, 4, are two counter-shafts, $a$ $b$, one above the other, and properly supported in bearings affixed to a stationary frame. These shafts receive their motion from the driving-shaft $c$ by means of a belt, $d$, that passes from pulley $c'$ on driving-shaft $c$ up over an idle-pulley, $f$, thence under and around a pulley, $b'$, on shaft $b$ and over pulley $a'$ on shaft $a$, thence down to driving-pulley $c'$, before named, as clearly shown in Figs. 1, 4, by which motion is properly given to shafts $a$ $b$ in opposite directions. On these shafts are pulleys that drive belts that are connected with pulleys on the several pairs of rollers on the train, (see Fig. 1,) and give them their proper rotation. In this way any number of pairs of rollers can be placed in train, either in line or otherwise at will, for the work to be done. A modification of this driving-belt arrangement is shown in Fig. 2, where the two counter-shafts $a$ $b$ are geared together at $b^2$, and one of the shafts is driven by belt $d$ from pulley $c'$. Fig. 3 shows but one counter-shaft, $a$, by which the train is driven by means of cross and open belts. It is obvious that these modifications all drive the rollers in the train with the same result. The heated rod is passed through the first pair of rollers, $x$, and reduced; thence through the well-known curved trough used as a repeater or guide, (not shown in the drawings,) which directs it to the second pair of rollers, $y$, as is now practiced. These rollers are smaller in diameter than the first pair, but are speeded up by the belt arrangement or otherwise, so that the circumferential velocity is greater than the first to about the degree that the rod has been elongated in passing through the preceding rollers. The process is thus repeated through a train sufficient to reduce the rod to the size required, each pair of rollers decreasing in size, successively, with increased circumferential velocity to take up the elongation of the rod, wire, or ribbon. By this arrangement and construction we can safely run the train at high speed, regulated by tightening the belt and by enlarging or diminishing the pulleys, all in a well-known way without changing the diameter of the rollers, by which the temperature of the rod is kept up throughout the process in a greater degree than has heretofore been attained.

Having thus described our improvement, we claim—

1. A train of rollers for rolling metal, gradually diminishing in diameter, driven by belts, arranged and combined, substantially as herein described, so as to increase the velocity of the periphery of each succeeding pair of rollers beyond those preceding to take up the increasing length of the rod in rolling, as above specified.

2. The combination of a series of rollers, $x$ $y$, in train, diminishing in diameter and increasing in circumferential velocity, as herein specified.

W. A. SWEET.
JOHN E. SWEET.

Witnesses:
M. D. CORNWALL,
F. G. TALLMAN.